United States Patent
Jeffords

(10) Patent No.: US 8,820,004 B1
(45) Date of Patent: Sep. 2, 2014

(54) BICYCLE STORAGE CONTAINER SYSTEM

(71) Applicant: Laura L. Jeffords, Washington, DC (US)

(72) Inventor: Laura L. Jeffords, Washington, DC (US)

(*) Notice: Subject to any disclaimer, the term of this patent is extended or adjusted under 35 U.S.C. 154(b) by 14 days.

(21) Appl. No.: 13/655,093

(22) Filed: Oct. 18, 2012

Related U.S. Application Data

(63) Continuation of application No. 61/548,392, filed on Oct. 18, 2011.

(51) Int. Cl.
| | |
|---|---|
| *E04H 1/00* | (2006.01) |
| *E04H 3/00* | (2006.01) |
| *E04H 5/00* | (2006.01) |
| *E04H 6/00* | (2006.01) |
| *E04H 9/00* | (2006.01) |
| *E04H 14/00* | (2006.01) |

(52) U.S. Cl.
CPC . *E04H 6/005* (2013.01); *Y10S 52/14* (2013.01)
USPC .......... 52/79.4; 52/79.2; 52/79.3; 52/DIG. 14

(58) Field of Classification Search
USPC ....... 52/79.1, 79.2, 79.3, 79.4, DIG. 14, 79.8; 211/17, 22; 150/166, 167; 224/309, 224/310
See application file for complete search history.

(56) References Cited

U.S. PATENT DOCUMENTS

| | | | | |
|---|---|---|---|---|
| 3,449,874 A * | 6/1969 | Beaupre | ........................... | 52/149 |
| 3,754,803 A * | 8/1973 | Underwood et al. | ........... | 312/31 |
| 3,843,001 A * | 10/1974 | Willis | ........................... | 414/462 |
| 3,949,528 A * | 4/1976 | Hartger et al. | ................. | 52/79.1 |
| 3,964,216 A * | 6/1976 | Hummel | ........................ | 52/79.1 |
| 3,967,425 A * | 7/1976 | Wolverton et al. | ........... | 52/236.1 |
| 4,074,476 A * | 2/1978 | Ordorika | ........................ | 52/79.2 |
| 4,352,432 A * | 10/1982 | Smith | ............................. | 211/19 |
| 4,438,606 A * | 3/1984 | Chardon et al. | ................ | 52/79.1 |
| 4,506,786 A | 3/1985 | Buchanan et al. | | |
| 4,790,109 A * | 12/1988 | Whidden | ........................ | 52/79.4 |
| 4,872,625 A * | 10/1989 | Filley | ........................ | 244/159.4 |
| 5,033,489 A * | 7/1991 | Ferre et al. | ................. | 134/57 R |
| 5,426,900 A * | 6/1995 | Springer | ........................ | 52/79.1 |
| 5,690,234 A * | 11/1997 | Rhead et al. | ..................... | 211/22 |
| 5,979,120 A * | 11/1999 | Hollstedt | ........................... | 52/65 |
| 5,988,403 A * | 11/1999 | Robideau | ........................ | 211/20 |
| 6,068,120 A | 5/2000 | Voorhees | | |
| 6,382,480 B1 * | 5/2002 | Egly et al. | ................. | 224/42.33 |
| 6,505,637 B1 | 1/2003 | Voorhees | | |
| 6,779,310 B2 * | 8/2004 | Grover | ........................ | 52/79.4 |
| 7,472,517 B2 * | 1/2009 | Blume | ........................ | 52/79.1 |
| 7,481,027 B2 * | 1/2009 | Blume | ........................ | 52/79.1 |
| 7,690,159 B1 * | 4/2010 | Arnold | ........................ | 52/167.1 |
| 7,694,830 B1 * | 4/2010 | Larson | ........................... | 211/20 |
| 2002/0014504 A1 * | 2/2002 | Hetu | ........................ | 224/310 |
| 2007/0221589 A1 * | 9/2007 | Bernard | ........................ | 211/17 |
| 2010/0163503 A1 | 7/2010 | Kelly | | |
| 2012/0005969 A1 * | 1/2012 | Broden | ........................ | 52/79.9 |

* cited by examiner

*Primary Examiner* — Brian Glessner
*Assistant Examiner* — Brian D Mattei
(74) *Attorney, Agent, or Firm* — Montgomery Patent & Design; Robert C. Montgomery

(57) ABSTRACT

A modular bicycle storage system designed primarily for use in urban environments includes a plurality of enclosures formed from a weatherproof fiberglass or plastic sheeting. The enclosure is accessed by a door that can be secured with a lock further includes lighting for nighttime use. A plurality of enclosures can be fastened and arranged in a modular fashion, both vertically and horizontally. The arrangement forms a pattern which is both space efficient and aesthetically pleasing. The enclosures also provide features which enable tethering to a ground surface if desired.

19 Claims, 4 Drawing Sheets

BICYCLE STORAGE CONTAINER SYSTEM

RELATED APPLICATIONS

The present invention was first described in and claims the benefit of U.S. Provisional Patent No. 61/548,392 filed Oct. 18, 2011, the entire disclosures of which are incorporated herein by reference.

FIELD OF THE INVENTION

The present invention relates generally to a storage container for a bicycle where the bicycle is secured to a track assembly affixed to an enclosure.

BACKGROUND OF THE INVENTION

The invention described herein pertains to a bicycle storage container and more particularly a plurality of modular storage units. Traditional bike racks provide a single static structure for securing a plurality of bicycles through the use of chains and/or locks. With advancements in bicycle construction such as quick-release tires, the use of a traditional bike rack often fails to provide adequate protection. It is difficult to lock both tires and a frame to a traditional rack through the use of a single chain or bike lock. When a bicyclist fails to lock their bike and tires to a rack, they all too often return to a stolen frame or wheels. Additionally, a traditional bike rack fails to provide any protection from the elements.

U.S. Pat. No. 4,506,786 to Alvin E. Buchanan et al. discloses a bicycle container having a substantially rectangular frame with an interior space for receiving a bicycle. The container has a track for guiding and securing a bicycles wheels during use. While the container provides additional security and protection from the elements as compared to a traditional bike rack, the open front and rear faces allow access to the bike from both thieves and the elements.

Another attempt at providing increased bicycle protection is disclosed in U.S. Pat. No. 6,505,637 to Stephen C. Voorhees. This patent describes a bicycle housing pivotally attached to a support frame. The housing is lowered over top of a bicycle and locked to the frame opposite the pivot point. This prevents the housing from being lifted and protects the bike from un-authorized access. The construction of this device does not allow for modular storage or an aesthetically pleasing arrangement of housings.

Although the various devices observed may fulfill their individual, particular objectives, each device suffers from one (1) or more disadvantage or deficiency related to design or function. Whether taken singly, or in combination, none of the observed devices disclose the specific arrangement and construction of the instant invention.

SUMMARY OF THE INVENTION

The inventor has recognized the deficiencies in the art pertaining to bicycle storage containers Furthermore, the inventor has observed that there is a need for secure public bicycle storage providing housing for a plurality of bicycle arranged in an efficient and aesthetically pleasing manner.

The inventor has addressed at least one (1) of the problems observed in the art by developing novel bicycle housing. It is a feature and aspect of the present invention to provide a bicycle storage container having a shell, first side panel, second side panel, rear panel and door. The door is affixed to a side panel through the use of hinges, and is secured in a closed position through use of a lock assembly and padlock. The rear panel is fastened to the side panels through use of first fasteners.

It is another aspect of the invention to provide a weather-resistant, translucent and elliptical-shaped rear panel and door. Additionally provided are weather-resistant, translucent arcuate-shaped side panels. When not in use the rear panel and door are removed and the side panels are pushed together, creating a flattened state for storage and transport. Furthermore, the side panels have reinforced frame portions providing increased rigidity and secure attachment points for the rear panel and door. The door and rear panel have corresponding flanged edge portions for mating with the reinforced frame of the side panels. Additionally, attached to an exterior portion of the side panels is a tether anchor for securing a first container to a second container.

It is yet another aspect of the invention to provide a track assembly for securing a bicycle in a vertical orientation. The track assembly includes a movable track, a pull handle, a stationary track, a first tire stop, a second tire stop and a plurality of rollers. Both the stationary track and the movable track have a "V"-shape, with the stationary track having a plurality of rollers mounted to an upper surface. The movable track is laterally attached to the stationary track through use of a retaining channel, and slides in a forward or rearward direction on the rollers. The first tire stop is affixed to the movable track and the second tire stop is affixed to the stationary track, with each receiving a rear and front bicycle tire respectively therein. The pull handle is affixed to the movable track and used as a grip for sliding the movable track.

It is a further aspect of the invention to provide at least one (1) light attached to an interior surface of each side panel. In a preferred embodiment, the lights are LED lamp units having an integral solar cell which charges an internal battery. An on/off switch is provided for user control when attempting to place or remove a bicycle during low light conditions.

It is still yet another aspect of the invention to provide a method for forming a modular arrangement of bicycle storage containers.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawing and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
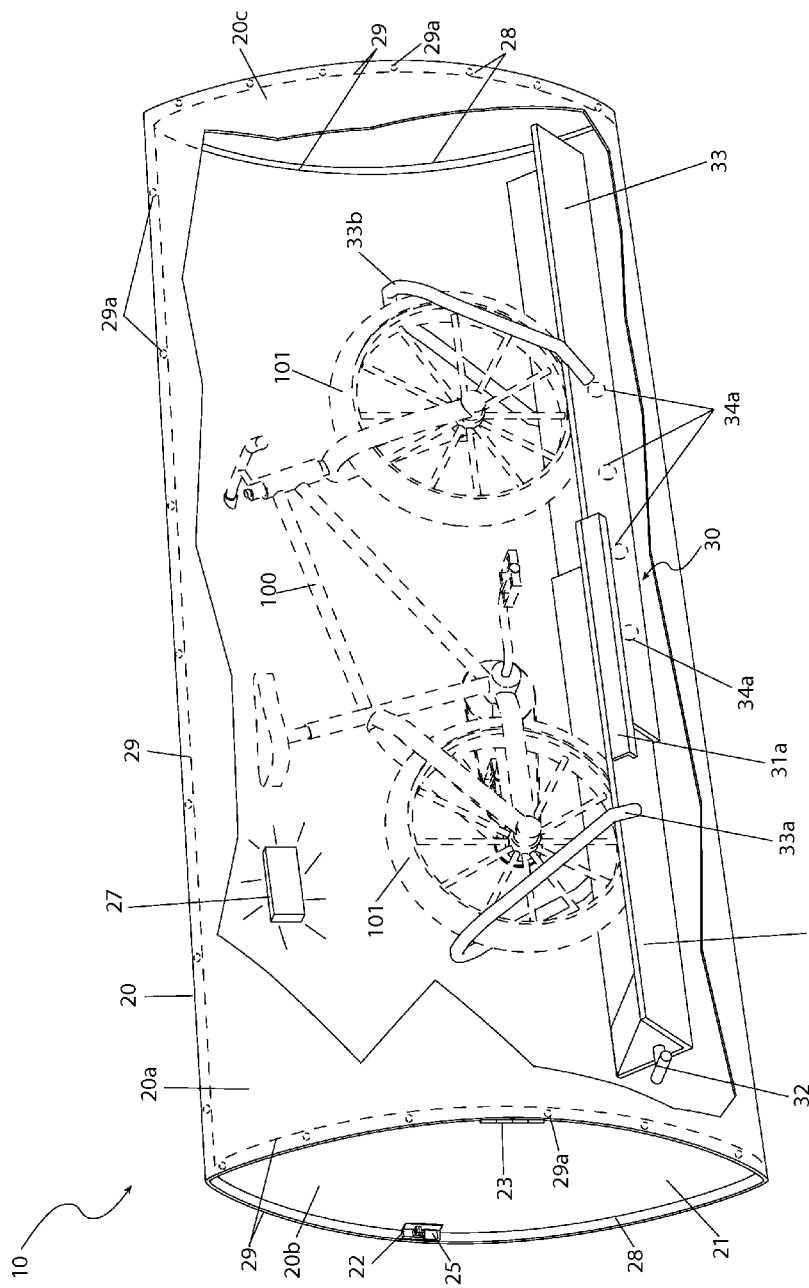
FIG. 1 is a cutaway environmental view of a bicycle storage container 10 depicting an in-use state, according to a preferred embodiment of the present invention.

DESCRIPTIVE KEY 10 bicycle storage container
20 shell
20a first side panel
20b second side panel
20c rear panel
21 door
22 lock assembly
23 hinge
24 tether anchor
25 padlock
27 light
28 flanged edge
29 frame
29a first fastener
30 bike track assembly
31 movable track
31a retaining channel
32 pull handle
33 stationary track
33a first tire stop
33b second tire stop
34a roller
34b roller axle
34c second fastener
100 bicycle
101 tire

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a bicycle storage container (herein referred to as an "apparatus") 10 being offered to solve one (1) or more of the aforementioned problems and fulfill one (1) or more of the aforementioned needs. The apparatus 10 provides secure storage and protection for a bicycle 100. The apparatus 10 is particularly adapted for modular use in an urban environment. The apparatus 10 is designed to accommodate a range of bicycle sizes. The apparatus 10 can be collapsed, transported, and a plurality of the apparatuses 10 may be attached to form an attractive structure.

Referring now to FIG. 1, a cutaway environmental view of the apparatus 10 depicting an in-use state, is disclosed. The apparatus 10 provides a durable, aesthetic and space-saving enclosure having a pointed elliptical cross sectional shape (i.e. vesica piscis), and being sized to receive a full range of bicycle 100 models and sizes. The apparatus 10 includes a shell 20 made using a lightweight semi-rigid translucent material such as fiberglass sheet, plastic sheet, or the like, being weather resistant and suitable for use in various locations. The shell 20 is to be preferably made using recycled materials. The shell 20 provides a four-part assembly comprising a first side panel 20a, a second side panel 20b, a rear panel 20c at a distal end, and a hinged door 21 at a proximal end, thereby forming a hollow container. When in use, the pointed elliptical-shape of the rear panel 20c and hinged door 21 portions support the arcuate shape of the side panels 20a, 20b enabling the shell 20 to hold its shape. The rear panel 20c and door 21 each comprise similarly-shaped elliptical panels that contain the open area between the side panels 20a 20b.

When in an empty state, one (1) or more shells 20 may be collapsed and stacked in a flattened state for purposes of storage and transport, if desired, by removing the first fasteners 29a, door 21, and rear panel 20c portions of each shell 20 and pressing the side panels 20a, 20b together upon a flat surface.

The side panels 20a, 20b further comprise reinforced frame portions 29 along perimeter edges envisioned to be folded-over doubly-thick portions which provide increased rigidity along top, bottom, rear, and front edges. Said reinforced frame portions 29 enable secure attachment of the door 21 and rear panel 20c portions. However, it is understood that the reinforced frame 29 may also utilize metal strips being fastened along said edge portions of the side panels 20a, 20b for increased strength with equal benefit, and as such should not be interpreted as a limiting factor of the apparatus 10. The reinforced frame 29 provides strength and rigidity to maintain the curved shape of the shell 20.

In a corresponding manner, the door 21 and rear panel 20c portions comprise flanged edge portions 28 formed at right angles so as to provide mating surfaces being orientated in a parallel manner to the aforementioned frame portions 29. One (1) flanged edge portion 28 of the door 21 is connected to a proximal frame portion 29 of the first side panel 20a via a vertical axial-type hinge 23 being fastened thereto using a plurality of first fasteners 29a such as rivets. The hinge 23 enables the door 21 to be swung open in order to access the inside of the shell 20. The door 21 also includes a lock assembly 22 being located opposite the hinge 23 which enables a user to lock the door portion 21 of the apparatus 10 such that a bicycle 100 inside the shell 20 cannot be accessed by unauthorized users. The lock assembly 20 preferably comprises a hasp device designed to utilize a removably attached padlock 25; however, it is understood that other locking means such as those incorporating an integral padlock, a deadbolt mechanism, or an electronic locking mechanism may be used with equal benefit, and as such should not be interpreted as a limiting factor of the apparatus 10.

The flanged edge portions 28 of the rear panel 20c are fastened to respective frame portions 29 of both side panels 20a, 20b using a plurality of first fasteners 29a to seal the rear opening of the shell 20.

Each side panel 20a, 20b preferably includes at least one (1) light 27 being affixed to an interior surface. The lights 27 provide illumination to a user when attempting to place or remove a bicycle 100 from the apparatus 10 during low light conditions. The lights 27 are envisioned to comprise adhesively-attached self-contained LED lamp units which preferably comprise an integral solar cell which charges an internal battery, and an on/off switch.

Figure 3:
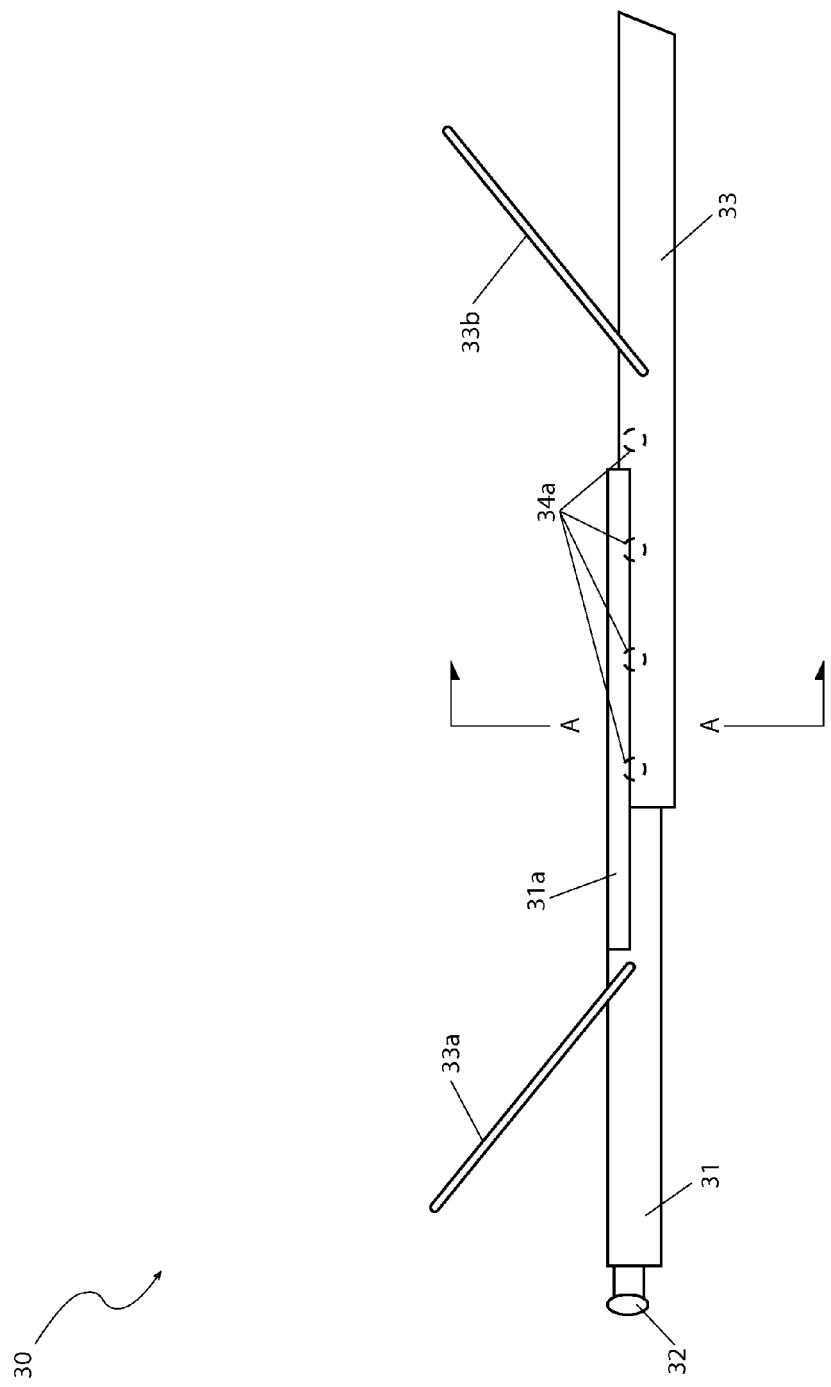
FIG. 3 is a side view of a bike track assembly portion 30, according to the preferred embodiment of the present invention; and, FIG. 4 is a section view of a bike track assembly portion 30 taken along section line A-A (see FIG. 3), according to the preferred embodiment of the present invention.
Figure 4:
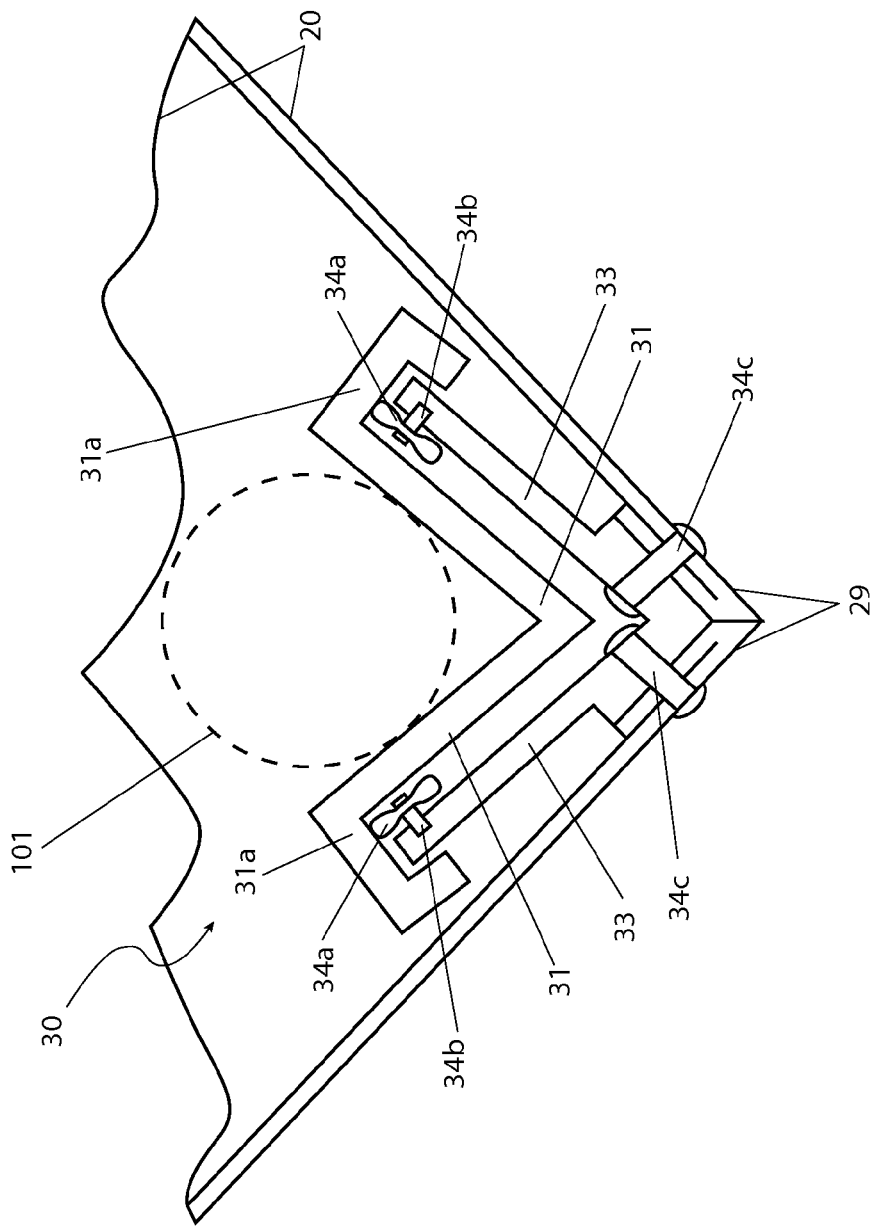

A lower interior portion of the shell 20 includes an adjustable bike track assembly 30 that provides a means to secure a bicycle 100 in a vertical orientation within the apparatus 10 and to easily and quickly load or remove the bicycle 100 from the apparatus 10 (see FIGS. 3 and 4).

Figure 2:
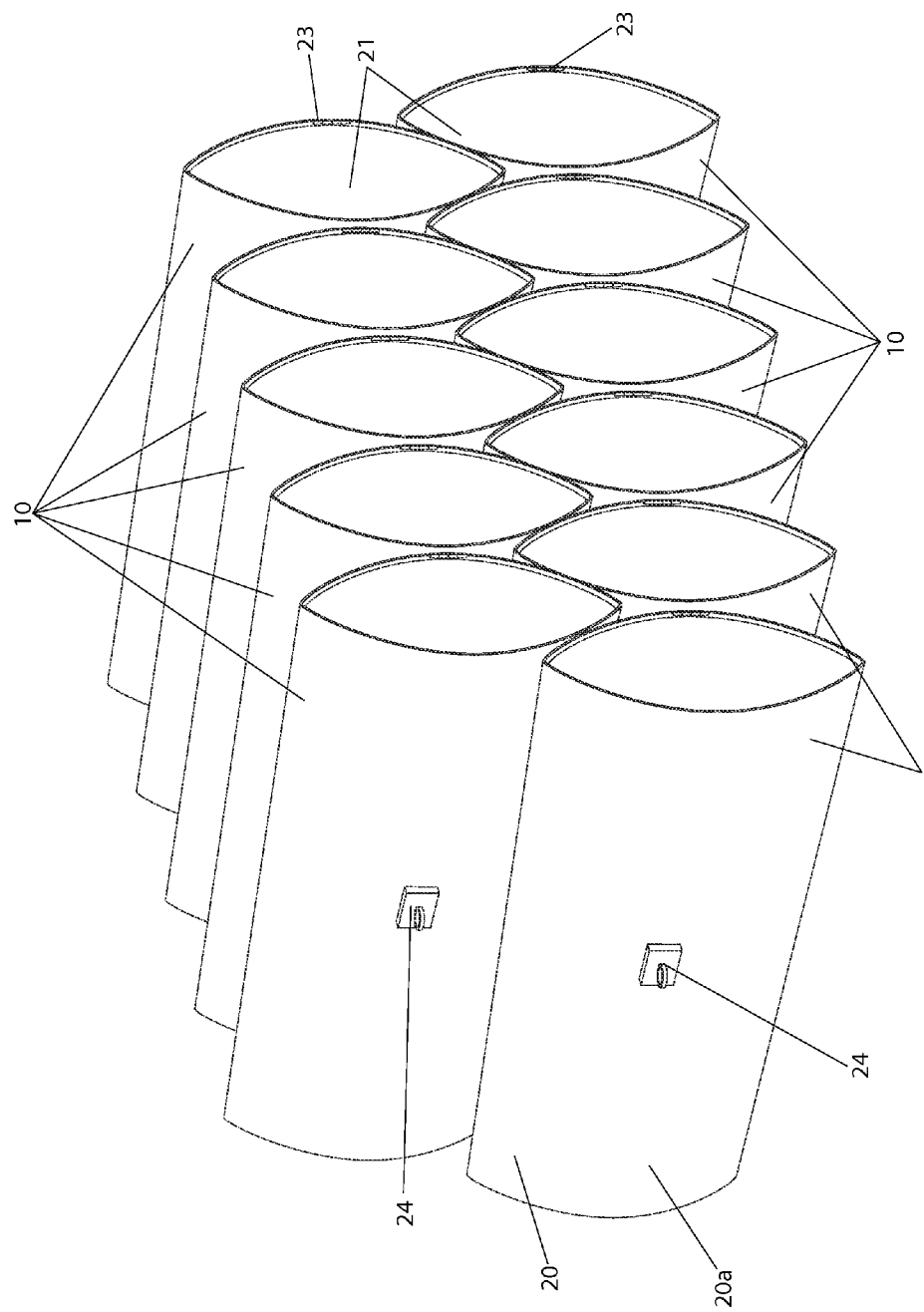
FIG. 2 is a perspective view of a plurality of bicycle storage containers 10, according to the preferred embodiment of the present invention.

Referring now to FIG. 2, a perspective view of a plurality of apparatuses 10, is disclosed. The apparatus 10 is designed to be modular in installation and arrangement such that a plurality of the apparatus 100 may be attached and situated compactly together in a single location forming a row as well being stacked vertically. Each shell 20 includes one (1) or more tether anchors 24 being preferably adhesively bonded to exterior surfaces of the shell 20. Each tether anchor 24 may be removably attached to a tether anchor portion 24 of an adjacent apparatus 10 or other fastening appendage on a nearby object. Each tether anchor 24 preferably comprises a ring or hook-shaped fastening bracket; however other designs may be utilized such as metal plates with threaded holes that enable direct hardware fastening to an adjacent tether anchor 24. In a preferred embodiment, each shell 20 has a tether anchor 24 located at a central position on both side panels 20a, 20b. It is further envisioned that additional tether anchors 24 may be installed along a bottom edge of the side panels 20a, 20b to provide a means for anchoring the apparatus 10 to a ground surface, or along a top edge to anchor the apparatus 10 to other apparatuses 10 being stacked above.

Referring now to FIGS. 3 and 4, side and section views of a bike track assembly portion 30 of the apparatus 10, are disclosed. The bike track assembly 30 includes a movable track 31, a pull handle 32, a stationary track 33, a first tire stop 33a affixed to the movable track 31, a second tire stop 33b affixed to the stationary track 33, and a plurality of rollers 34a. The bike track assembly 30 is to be made using lightweight materials such as aluminum where possible to help minimize the weight of the apparatus 10. The stationary track 33 comprises a piece of "V"-shaped aluminum angle being fastened to a lower interior edge of each side panel 20a, 20b using a plurality of second fasteners 34c such as rivets, screws, or the like. The stationary track 33 is oriented such that the open top of the "V"-shape faces upwardly. The movable track 31 comprises a "V"-shaped structure having integral retaining channel portions 31a along each outer edge enabling the movable track 31 to slide along the top surface of the stationary track 33. Smooth motioning of the movable track 31 upon the stationary track 33 is facilitated by a plurality of rollers 34a being stationarily-mounted to upper surfaces of the stationary track 33 along opposing outer edges which contact an inner surface of the retaining channels 31a. Said retaining channel portions 31a wrap around and captivate outer edge portions of the stationary track 33, thereby acting to laterally attach the movable track 31 to the stationary track 33. Thus, the rollers 34a provide low-friction motioning of the movable track 31 in forward or rearward directions along the stationary track 33. The rollers 34a preferably comprise low-profile neoprene wheels being rotatingly mounted to the stationary track 33 via perpendicular linear roller axle portions 34b.

The first tire stop 33a and second tire stop 33b each comprise mirror-image rigid "U"-shaped structures being particularly sized so as to receive respective rear and front bicycle tires 101 within. The first tire stop 33a and second tire stop 33b are permanently affixed at relative diverging angles to respective movable 31 and stationary 33 track portions via welding or equivalent means. While the bicycle 100 is situated atop the bike track assembly 30, said tire stops 33a, 33b captivate the tire portions 101 of the bicycle 100 as the movable track 31 slides inwardly, thereby holding the bicycle 100 in a stable upright position.

The pull handle 32 comprises an ergonomic gripping means integrated upon a front end of the movable track 31.

The pull handle 32 provides a simple means for a user to motion the movable track 31 inwardly or outwardly from the shell 20 when the door 21 is opened. The movable track 31 can be pulled completely out from the shell 20 such that the user can easily place a front tire portion 101 of the bicycle 100 against the second tire stop portion 33b of the stationary track 33. The user would then use the pull handle 32 to push the movable track 31 onto the stationary track 33 until the first tire stop 33a abuts against the rear tire portion 101 of the bicycle 100 prior to closing the door 21 and securing it using the lock assembly 22.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed and utilized as indicated in FIGS. 1 and 2.

The method of assembling and utilizing the apparatus 10 may be achieved by performing the following steps: procuring the apparatus 10 in a disassembled and collapsed state; transporting the apparatus 10 to a desired area; attaching the flanged edges 28 and frame portions 29 of the side panels 20a, 20b and rear panel 20c together using first fasteners 29a to form the shell 20; attaching the hinge 23 to a proximal edge of the frame portion 29 of the first side panel 20a using the first fasteners 29a; attaching the bike track assembly 30 to lower inner surfaces of the side panels 20a, 20b using the second fasteners 34c; and, adhesively attaching the lights 27 to inner surfaces of the side panels 20a, 20b at desired locations, if not previously installed. The apparatus 10 is now ready to receive a bicycle 100.

The method of utilizing the apparatus 10 to contain a bicycle 100 may be achieved by performing the following steps: turning on the lights 27 if installing the bicycle 100 during low-light conditions; gripping the pull handle 32 and pulling the movable track 31 outwardly from the shell 20; placing a bicycle 100 onto the stationary track 33 such that either tire portion 110 contacts the second tire stop 33b; using the pull handle 32 to push the retaining channel portions 31a of the movable track 31 inwardly onto the roller portions 34a of the stationary track 33 until the first tire stop 33a contacts the opposing tire 101 of the bicycle 100; turning the light 27 off; closing the door 21; and, installing and locking the padlock portion 25 of the locking assembly 22 such that the bicycle 100 will be secure and protected within the shell 20 until such time the user is ready to obtain the bicycle 100 from the apparatus 10 for subsequent use.

The apparatus 10 may be fastened to adjacent apparatuses 10, ground surfaces, or any other desired object by utilizing common tethering hardware and fasteners to fasten the tether anchors 24 to those objects.

The apparatus 10 is intended to provide various benefits to a user over other methods of bicycle parking methods in an urban environment. The apparatus 10 can be readily transported to a desired location and assembled with minimal effort.

A plurality of the apparatus 100 may be attached and situated compactly together in a single location forming a row as well being stacked vertically. The shape of each shell 20 is designed to accommodate slight variations in grade between adjacent apparatuses 10 while enabling multi-level vertical arrangements and gently curving horizontal arrangements.

The apparatus 10 facilitates ease of loading and security for a bicycle 100. The apparatus 10 provides a valuable aesthetic presence when installed. The construction of the apparatus 10 promotes minimal energy and material waste both during manufacture and during use by comprising recycled materials and low operating energy requirements, and by providing a durable, reusable, reconfigurable, transportable construction.

When in an empty state, one (1) or more apparatuses 10 may be disassembled, collapsed, and stacked in a flattened state for purposes of compact storage and economical transportation by removing the first fasteners 29a holding the door 21 and rear panel 20c portions to the side panels 20a, 20b, and pressing the side panels 20a, 20b together upon a flat surface.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A bicycle storage container comprising:
   an enclosure having a pointed elliptical cross-sectional shape, comprising:
      a pair of side panels;
      a rear panel fastened to said side panels; and,
      a door fastened to a first side panel with a hinge and removably secured to a second side panel;
   a track assembly fastened to an interior surface of each of said pair of side panels, said track assembly comprising:
      a stationary track;
      a movable track slidingly engaged with said stationary track;
      a first tire stop affixed to said movable track;
      a second tire stop affixed to said stationary track; and,
      a handle affixed to said movable track to motion said movable track relative to said stationary track; and,
   a plurality of anchors each fastened to an exterior surface of said pair of side panels;
   wherein said first tire stop and said second tire stop are each configured to receive a bicycle tire therein;
   wherein said enclosure is configured to fully house a bicycle therein; and,
   wherein said plurality of anchors is configured to secure a tether thereto to provide a stable anchor for said container.

2. The storage container of claim 1, wherein said side panels, said rear panel, and said door comprises a lightweight semi-rigid weather-resistant translucent material.

3. The storage container of claim 1, wherein said pair of side panels each further comprises a reinforced frame portion along a perimeter edge thereof;
   wherein said hinge is fastened to a forward location of said reinforced frame on said first side panel and said door is removably secured to a forward location of said reinforced frame on said second side panel opposite said hinge;
   wherein said rear panel is fastened to a rearward location of said reinforced frame of said first and second side panels; and,
   wherein said reinforced frame provides strength and rigidity to maintain said shape of said enclosure.

4. The storage container of claim 3, wherein said door and said rear panel each comprise a flanged edge portion fastened to said reinforced frame of said pair of side panels.

5. The storage container of claim 1, further comprising at least one illumination device affixed to an interior surface of one of said pair of side panels.

6. The storage container of claim 5, wherein said at least one illumination device is a self-contained LED lamp unit comprising an internal solar cell adhesively attached to one of said pair of side panels.

7. The storage container of claim 1, further comprising a plurality of rollers statically mounted to upper surfaces of said stationary track and contacting inner surfaces of said movable track.

8. The storage container of claim 7, wherein said movable track travels outward through said door to a position where said first tire stop and second tire stop are external from said enclosure.

9. The storage container of claim 7, wherein said stationary track comprises a "V"-shaped angle body fastened to a lower interior edge of each of said pair of side panels.

10. The storage container of claim 9, wherein said movable track comprises a "V"-shaped angle body having integral retaining channel portions along each outer longitudinal edge captivating outer longitudinal edges of said stationary track. fastened to a lower interior edge of each of said pair of side panels;
    wherein said plurality of rollers contact an inner surface of said retaining channel portions.

11. The storage container of claim 7, wherein said plurality of rollers each further comprises a low-profile neoprene wheels and a linear roller axle portion mounted to said stationary track.

12. The storage container of claim 7, wherein said first tire stop and said second tire stop each comprise a rigid "U"-shaped structure.

13. The storage container of claim 12, wherein said first tire stop is affixed to said stationary track and said second tire stop is affixed to said movable track at relative diverging angles.

14. The storage container of claim 1, wherein said plurality of anchors is each removably attached to said enclosure with adhesive bonding.

15. A method of providing storing a bicycle within a bicycle storage container comprises the following steps:
    providing an enclosure having a pointed elliptical cross-sectional shape including a pair of side panels, a rear panel fastened to a rear of said pair of side panels, a door having a hinge attached to a front of one of said pair of side panels and removably secured to a front of an opposing one of said pair of side panels, a stationary track mounted to an interior of said enclosure, a movable track slidingly engaged with a plurality of rollers affixed to said stationary track, a handle attached to a front of said movable track, a first tire stop affixed to said movable track, a second tire stop affixed to said stationary track, and a plurality of anchors attached to an exterior of said enclosure;
    securing said bicycle storage container to one or more adjacent bicycle storage containers or an external support structure with a tether attached to said plurality of anchors;
    opening said door;

pulling on said handle to motion said movable track outwardly from said enclosure;
placing a bicycle on said movable track;
securing a first tire of said bicycle within said first tire stop;
pushing on said handle to motion said movable track and said bicycle into said enclosure; and,
securing a second tire of said bicycle within said second tire stop.

16. The method of claim 15, further comprising the step of installing at least one illumination device to an interior surface of said enclosure comprising a translucent construction;
wherein said illumination device further comprises a self-contained LED lamp unit having an internal solar cell.

17. A method of providing a modular arrangement of a plurality of bicycle storage containers, said method comprising the steps of:
providing said plurality of bicycle storage containers each comprising an enclosure having a pointed elliptical cross-sectional shape including a pair of side panels, a rear panel fastened to a rear of said pair of side panels, a door having a hinge attached to a front of one of said pair of side panels and removably secured to a front of an opposing one of said pair of side panels, a stationary track mounted to an interior of said enclosure, a movable track slidingly engaged with a plurality of rollers affixed to said stationary track, a handle attached to a front of said movable track, a first tire stop affixed to said movable track, a second tire stop affixed to said stationary track, and a plurality of anchors attached to an exterior of said enclosure;
arranging said plurality of bicycle storage containers in a desired configuration; and,
securing each of said plurality of bicycle storage containers to one or more adjacent bicycle storage containers or a external support structure with a tether attached to said plurality of anchors.

18. The method of claim 17, wherein a step of storing a bicycle into a desired one of said plurality of bicycle storage containers further comprising the steps of:
opening said door of a desired one of said bicycle storage containers;
pulling on said handle to motion said movable track outwardly from said enclosure;
placing a bicycle on said movable track;
securing a first tire of said bicycle within said first tire stop;
pushing on said handle to motion said movable track and said bicycle into said enclosure; and,
securing a second tire of said bicycle within said second tire stop.

19. The method of claim 18, further comprising the step of installing at least one illumination device to an interior surface of said enclosure comprising a translucent construction;
wherein said illumination device further comprises a self-contained LED lamp unit having an internal solar cell.

* * * * *